(12) United States Patent
Ito

(10) Patent No.: US 7,726,369 B2
(45) Date of Patent: Jun. 1, 2010

(54) PNEUMATIC TIRE WITH TREAD HAVING LATERAL GROOVES PROVIDED WITH TIE BARS

(75) Inventor: Kuniaki Ito, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 903 days.

(21) Appl. No.: 11/483,643

(22) Filed: Jul. 11, 2006

(65) Prior Publication Data

US 2007/0012389 A1    Jan. 18, 2007

(30) Foreign Application Priority Data

Jul. 12, 2005    (JP)    ............... 2005-203366

(51) Int. Cl.
*B60C 11/11*    (2006.01)
*B60C 11/13*    (2006.01)

(52) U.S. Cl. .................. 152/209.22; 152/902

(58) Field of Classification Search ........... 152/209.18, 152/209.22, 900, 901, 902
See application file for complete search history.

(56) References Cited

U.S. PATENT DOCUMENTS 3,682,220 A  *  8/1972  Verdier .................. 152/209.22
4,223,712 A  *  9/1980  Iwata et al. ............ 152/209.22
5,316,062 A  *  5/1994  Lurois .................... 152/209.22
5,482,099 A  *  1/1996  Kajiwara et al. ........ 152/209.1
5,580,404 A  * 12/1996  Hitzky ................... 152/209.22
6,695,024 B2 *  2/2004  Neugebauer et al. ... 152/209.22
7,484,542 B2 *  2/2009  Sundkvist et al. ...... 152/209.22

FOREIGN PATENT DOCUMENTS

| DE | 19548733 | * | 6/1997 |
| JP | 02-003501 | * | 1/1990 |
| JP | 11-245628 | * | 9/1999 |
| JP | 2002-67624 A | | 3/2002 |

* cited by examiner

*Primary Examiner*—Steven D Maki
(74) *Attorney, Agent, or Firm*—Birch, Stewart, Kolasch & Birch, LLP

(57) ABSTRACT

A pneumatic tire comprises a tread portion provided with at least two circumferential grooves and lateral grooves extending from the circumferential grooves so as to form blocks which are circumferentially divided by the lateral grooves and arranged in at least three circumferential rows axially divided by said at least two circumferential grooves. Each of the lateral grooves is provided with a tie-bar rising from the groove bottom to a certain height as to connect the opposite groove walls with each other. The tie-bars in the lateral grooves extend towards the adjacent circumferential grooves but terminate before the circumferential grooves so as to provide certain distances therebetween, and the distances are gradually decreased from the axially outside to the axially inside of the tread portion. The inclination angles of the lateral grooves are gradually decreased from the axially outside to the axially inside of the tread portion.

8 Claims, 6 Drawing Sheets

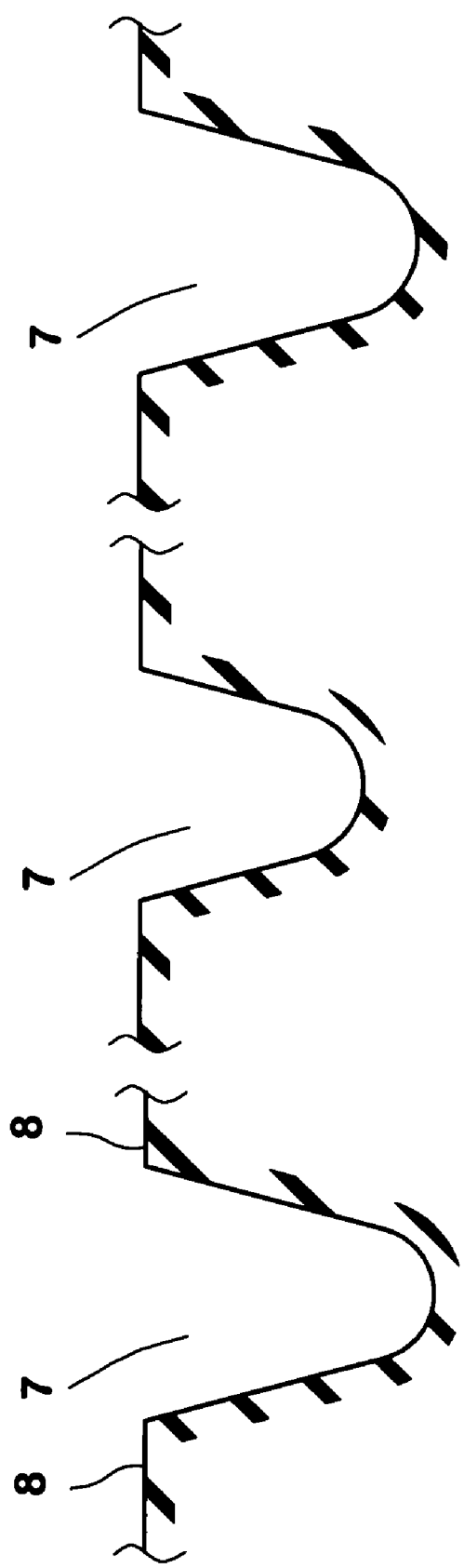

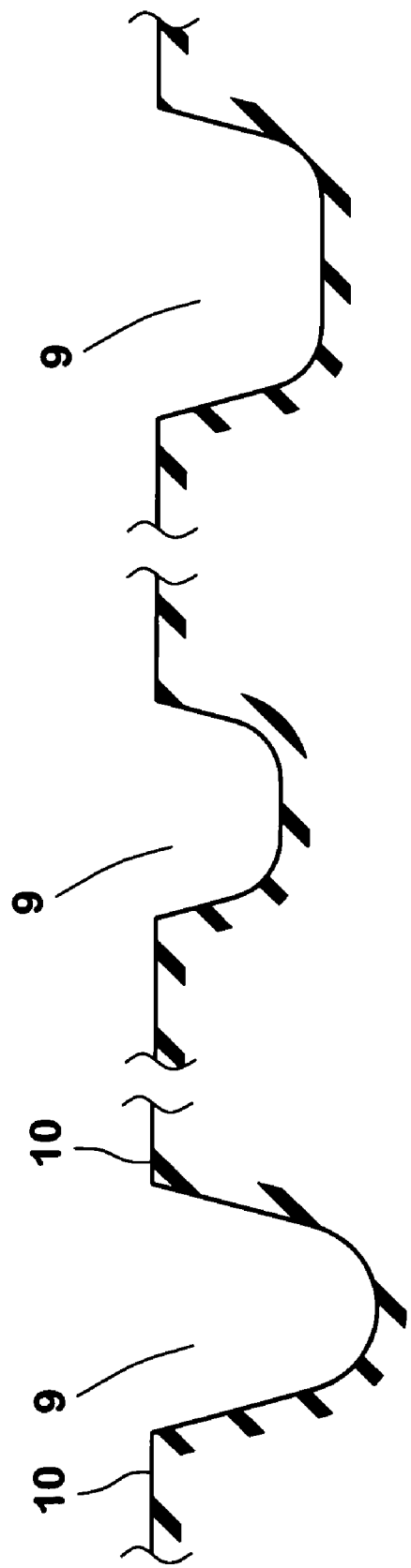

PNEUMATIC TIRE WITH TREAD HAVING LATERAL GROOVES PROVIDED WITH TIE BARS

BACKGROUND OF THE INVENTION

The present invention relates to a pneumatic tire, more particularly to a tread structure suitable for all-season heavy duty tires.

All-season tires for the use in areas that receive moderate levels of snowfall, are usually provided with block-type tread patterns in order to provide good traction.

Such all-season tires are becoming popular even in heavy duty vehicles, e.g. trucks, buses and the like because a level of traction can be obtained throughout the entire year and also because of the convenience of avoiding a tire changeover.

In general, a block-type tread pattern is made up of blocks arranged in a plurality of circumferential rows, for instance as disclosed in the Japanese patent application publication JP-A-2002-67624. Since the blocks are separated from each other by tread grooves, the rigidity thereof is relatively low. Thus, during running, the blocks in the ground contacting patch are liable to move against the road surface, causing uneven wear such as so-called heel-and-toe wear.

Incidentally, the heel-and-toe wear is a state of uneven wear of a block, namely, such a state that the toe-side edge and heel-side edge of a block are worn out more than the other portions of the block. Usually, wear starts from the corners of the block and expands into heel-and-toe wear. If the heel-and-toe wear is large, the wear of the entire block becomes rapid.

In general, on the other hand, the ground pressure of a heavy duty tire has a tendency to increase gradually from the tread shoulders to the tread center due to a round tread profile. Therefore, as the position of a block becomes closer to the tread center, the block suffers from a larger wear.

SUMMARY OF THE INVENTION

It is therefore, an object of the present invention to provide a pneumatic tire, in which, by optimizing the rigidity distribution of tread elements or blocks to accord with the ground pressure distribution typical of the heavy duty pneumatic tires, uneven wear of the tread blocks on the whole is effectively improved, and thereby the wear resistance of the tread portion is increased to prolong the tread wear life.

According to the present invention, a pneumatic tire comprises a tread portion provided with at least two circumferential grooves and lateral grooves extending from the circumferential grooves so as to form blocks which are circumferentially divided by the lateral grooves and arranged in at least three circumferential rows axially divided by said at least two circumferential grooves, and each of the lateral grooves is provided with a tie-bar rising from the groove bottom to a certain height within the depth of the lateral groove so as to connect the opposite groove walls with each other, wherein the tie-bars in the lateral grooves extend along the respective lateral grooves towards the adjacent circumferential grooves but terminate before the circumferential grooves so as to provide certain distances therebetween, and the distances are gradually decreased from the axially outside to the axially inside of the tread portion.

Preferably, the inclination angles of the lateral grooves each measured at the axial groove center are gradually decreased from the axially outside to the axially inside of the tread portion.

BRIEF DESCRIPTION OF THE DRAWINGS

FIGS. 8A, 8B and 8C are enlarged cross sectional views of the crown lateral groove taken along lines A1, A2 and A3 of FIG. 7, respectively.

FIGS. 9A, 9B and 9C are enlarged cross sectional views of the shoulder lateral groove taken along lines C1, C2 and C3 of FIG. 7, respectively.

DESCRIPTION OF THE PREFERRED EMBODIMENTS

Figure 1:
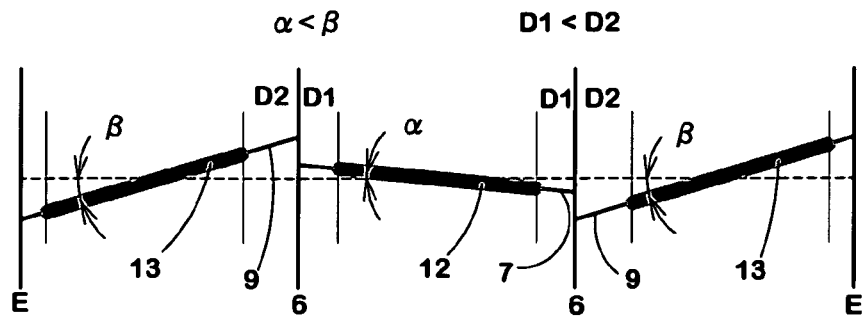
FIGS. 1, 2, 3 and 4 are diagrams each showing an example of the tread groove arrangement according to the present invention.

Embodiments of the present invention will now be described in detail in conjunction with the accompanying drawings.

In the drawings, pneumatic tire 1 according to the present invention comprises, as well know in the art, a tread portion 2, a pair of axially spaced bead portions each with a bead core therein, a pair of sidewall portions extending between the tread edges and the bead portions, a toroidal carcass 3 extending between the bead portions through the tread portion 2 and sidewall portions, and a belt 4 disposed radially outside the carcass in the tread portion.

Figure 6:
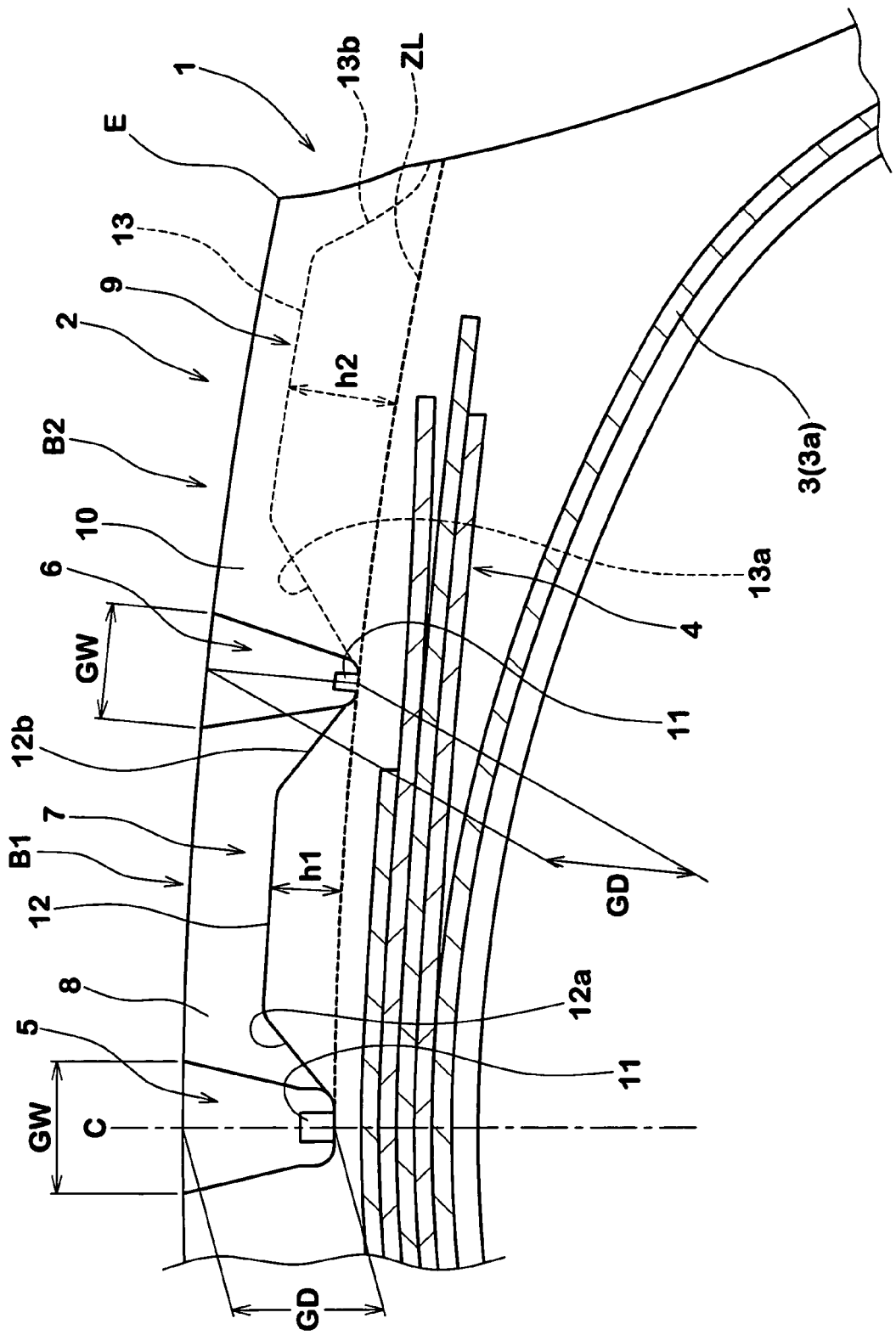
FIG. 6 is a cross sectional view showing a part of the tread portion.

In this embodiment, the pneumatic tire 1 is an all-season radial tire for trucks and buses. The tire 1 is provided with a square shoulder is adopted. In other words, in the cross section of the tire 1, as shown in FIG. 6, the tread edge E is angulated by an angle of about 90 degrees to about 135 degrees.

The carcass 3 comprises at least one ply $3a$ of radially arranged cords. In this example, the carcass 3 is composed of a single ply $3a$ of radially arranged steel cords.

The belt 4 comprises at least two cross breaker plies of parallel cords and an optional band ply. In this example, the belt 4 is composed of four plies of parallel steel cords.

The tread portion 2 is provided with tread grooves defining a block pattern. The tread grooves include circumferential grooves (5, 6) and lateral grooves (7, 9). The circumferential grooves (5, 6) extend continuously in the tire circumferential direction so as to axially divide the tread portion 2 into circumferential parts.

The lateral grooves (7, 9) extend from the circumferential grooves (5, 6) to divide the above-mentioned circumferential parts into blocks (8, 10) in circumferential rows (B1, B2).

The number of the circumferential grooves (5, 6) is in a range of from 2 to 5, therefore, the number of the block rows (B1, B2) is 3 to 6.

FIGS. 1-4 are diagrams for explaining the basic concept of the present invention. FIGS. 1-4 show examples of the tread groove arrangement provided with two, three, four and five circumferential grooves, respectively, wherein "6" denotes shoulder circumferential grooves, "5" denotes crown circumferential grooves, "9" denotes shoulder lateral grooves, and "7" denotes crown lateral grooves.

The shoulder lateral grooves 9 are each defined as extending from one of the shoulder circumferential grooves 6, namely, the axially outermost circumferential grooves to the adjacent tread edge E. The shoulder lateral grooves 9 are opened at the tread edge E, whereby so called buttress portion is formed in the radially outermost part of the sidewall portion.

The crown lateral grooves 7 are each defined as extending between the axially adjacent circumferential grooves (6 and 6), (6 and 5) or (5 and 5).

The lateral grooves 7 and 9 have almost same axial lengths.

As to the width GW and depth GD of each of the circumferential grooves 5 and 6, since the primary objective of the circumferential grooves is to provide good drainage, the width GW is at least 5 mm, preferably at least 8 mm, more preferably at least 10 mm, and the depth GD is at least 12 mm, preferably at least 15 mm. more preferably at least 18 mm. As to the upper limits, on the other hand, in the case of truck/bus tires, usually the width GW is at most 25 mm, preferably at most 20 mm, more preferably at most 17 mm, and the depth GD is at most 25 mm, preferably at most 22 mm.

In order to enhance the drainage from the tread center, the circumferential groove 5 disposed at the tread center (examples in FIGS. 2, 4, 5) or near the tire equator c (examples on FIGS. 3, 4) is preferably increased in the cross sectional area when compared with the shoulder circumferential grooves 6. Such a difference in the cross sectional area is preferably provided in such a manner as forming circumferential grooves 5 and 6 with different widths GW and/or different groove wall inclination angles, while keeping the depths GW at substantially same values.

Similarly, the primary objective of the lateral grooves 7 and 9 is to provide good drainage, therefore, the widths thereof are at least 5 mm, but usually, at most 16 mm.

According to one aspect of the present invention,
(1) the inclination angles (alpha) and (beta) of the lateral grooves 7 and 9 are decreased from the tread edges to the tread center, wherein the inclination angle of each lateral groove is defined as the angle of an axial center part of the lateral groove with respect to the tire axial direction (which is for instance measured at the axial central point 7c, 9c of the lateral groove), and
(2) each of the lateral grooves 7 and 9 is provided in an axial central part thereof with a tie-bar (12, 13) so that a certain distance (D1, D2 . . . , generically D) is formed between each of longitudinal ends of the tie-bar to the adjacent end of the lateral groove, and the distances (D) are decreased from the tread edges to the tread center.

If the inclination angle (beta) of the shoulder lateral groove 9 is too large, the circumferential rigidity of the shoulder blocks 10 is remarkably lowered, so uneven wear is apt to concentrate on the shoulder blocks 10.

Therefore, the inclination angle (beta) is limited to at most 45 degrees, preferably less than 40 degrees, more preferably less than 35 degrees, still more preferably not more than 30 degrees. If the difference between the inclination angle and the next larger or smaller inclination angle is excessively small, a sufficient and effective difference in block rigidity can not be obtained so uneven wear tends to occur at the blocks in the tread crown. From such a point of view, the angle difference is at least 5 degrees, preferably not less that 10 degrees, more preferably not less than 15 degrees.

In the case of two circumferential grooves 6 and 6 as shown in FIG. 1, 0=<alpha<beta<45 degrees, and (1)

D1<D2. (2)

Figure 2:
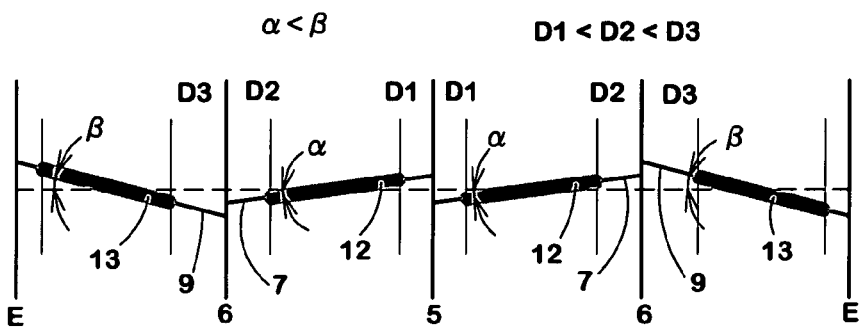

In the case of three circumferential grooves 6, 5 and 6 as shown in FIG. 2, 0=<alpha<beta<45 degrees, and (1)

D1<D2<D3. (2)

Figure 3:
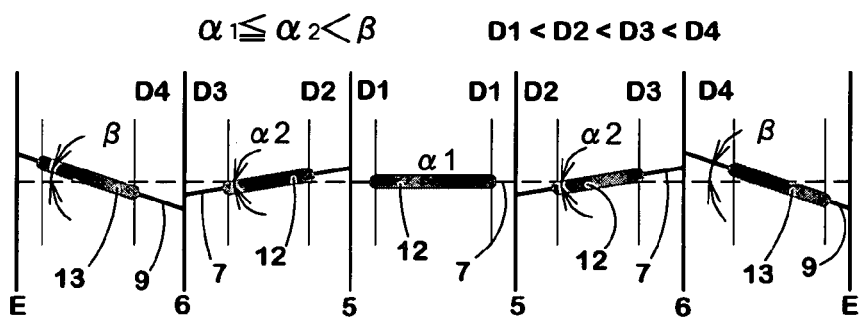

In the case of four circumferential grooves 6, 5, 5 and 6 as shown in FIG. 3, 0=<alpha1=<alpha2<beta<45 degrees, preferably alpha1<alpha2, and (1)

D1<D2<D3<D4. (2)

Figure 4:
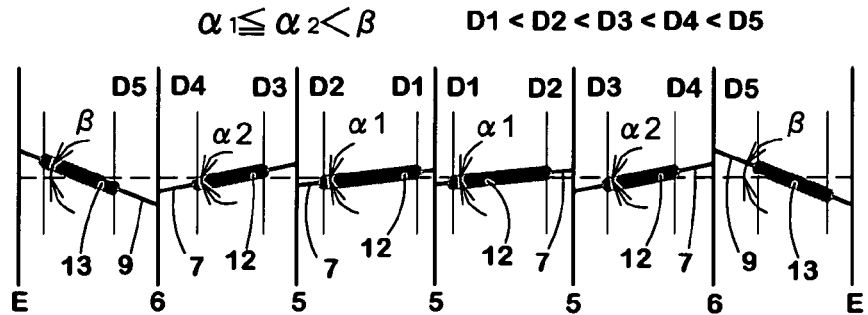

In the case of five circumferential grooves 6, 5, 5, 5 and 6 as shown in FIG. 4, 0=<alpha1=<alpha2<beta<45 degrees, preferably alpha1<alpha2, and (1)

D1<D2<D3<D4<D5. (2)

Therefore, the blocks 8 and 10 are provided with circumferential support gradually increasing from the axially outside to the axially inside of the tread portion. The corners of the blocks between the circumferential grooves and the lateral grooves are gradually increased in rigidity from the axially outside to the axially inside of the tread portion. As a result, the heel-and-toe wear of the blocks is effectively and optimally reduced, and the resistance to uneven wear of the tread portion can be remarkably improved.

Next, taking up a more concrete example shown in FIGS. 5, 6 and 7, the present invention is described in detail below.

In this example, two shoulder circumferential grooves 6 and one crown circumferential groove 5 are disposed, and all of the three circumferential grooves 5 and 6 have a zigzag configuration. But, according to the present invention, various configurations, e.g. straight configuration, wavy configurations and the like can be used aside from the zigzag configuration. Further, it is also possible that the circumferential grooves 5 and 6 have different configurations. For instance, a combination of zigzag grooves and a straight groove therebetween, a combination of wavy grooves and a straight groove therebetween, a combination of zigzag grooves and a wavy groove, a combination of a steeply zigzag groove and a gently zigzag groove and other various combinations may be possible.

Figure 5:
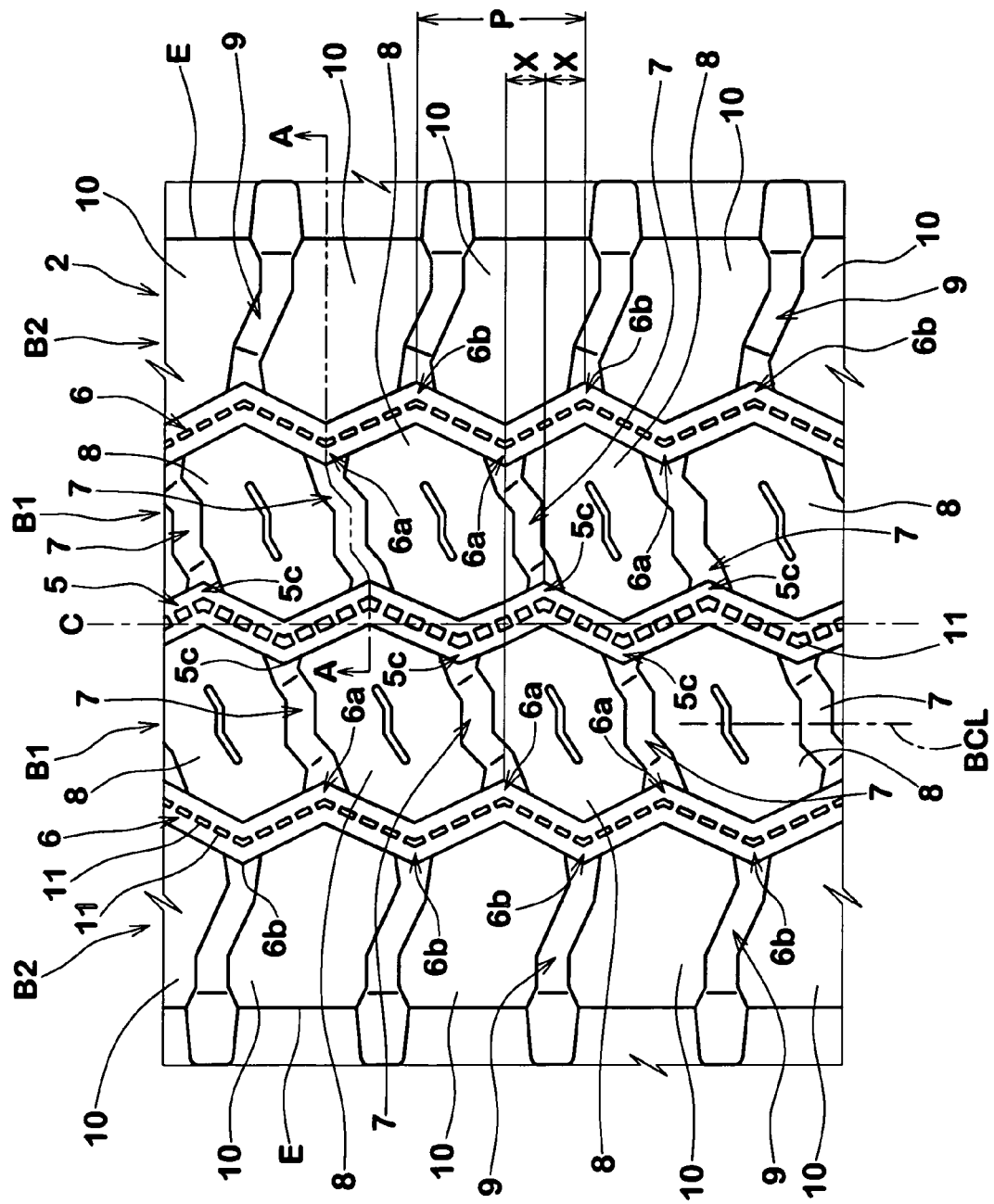
FIG. 5 is a partial view of the tread portion of a heavy duty tire according to the present invention showing an example of the tread pattern.

In FIG. 5, all the three circumferential grooves 5 and 6 have substantially same zigzag pitches P in the tire circumferential direction. With respect to the phase of the zigzag, the circumferential grooves 5 and 6 are circumferentially shifted from one another by one quarter pitch P or one quarter cycle from one of the shoulder circumferential grooves 6 to the other shoulder circumferential groove 6.

As a result, the paired shoulder circumferential grooves 6 are shifted from each other by one half cycle, so their zigzag configurations become mirror symmetric about the tire equator C. And the crown circumferential groove 5 is shifted from each of the shoulder circumferential grooves 6 by one quarter pitch P.

In this example, as shown in FIG. 5, each of the crown lateral grooves 7 extends from one of the zigzag peaks 5c of the crown circumferential groove 5 to the nearest zigzag peak 6a of one of the shoulder circumferential grooves 6. As a result, the crown lateral grooves 7 on the whole appear to incline toward one circumferential direction.

The shoulder lateral grooves 9 extend from the respective zigzag peaks 6b of the shoulder circumferential grooves 6 to the tread edges E so that the shoulder lateral grooves 9 on the whole appear to incline toward the opposite circumferential direction to that of the crown lateral grooves 7, whereby the inclining directions of the lateral grooves 7 and 9 as a whole are evened, and drifting of the vehicle during straight running can be prevented.

The tread portion 2 is therefore divided into shoulder blocks 10 in two rows B2 each arranged along one of the tread edges E, and crown blocks 8 in two rows B1 between the rows B2.

Figure 7:
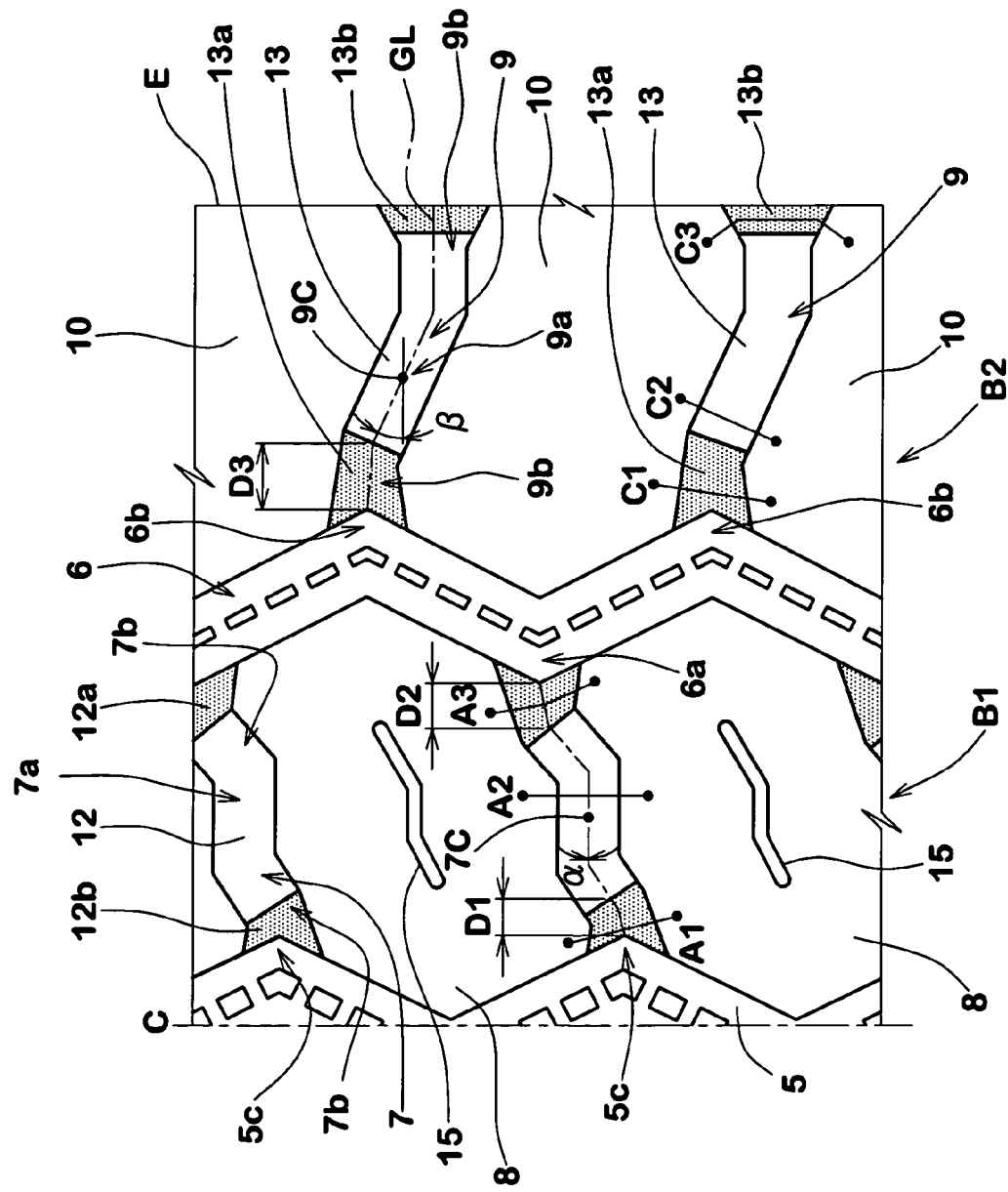
FIG. 7 is an enlarged view showing the crown lateral groove and shoulder lateral groove.

To meet the above-mentioned condition (1), the crown lateral grooves 7 are each provided with a straight center part 7a having an inclination angle (alpha), and the shoulder lateral grooves 9 are each provided with a straight center part 9a having an inclination angle (beta) as shown in FIG. 7, wherein the inclination angle (alpha) is smaller than the inclination angle (beta).

As explained above, the angle difference (beta-alpha) is at least 5 degrees, preferably at least 10 degrees, more preferably at least 15 degrees.

In the example shown in FIGS. 5-7, the inclination angles (alpha) of the crown lateral grooves 7 are substantially zero. The inclination angles (beta) of the shoulder lateral grooves 9 are about 25 degrees with respect to the tire axial direction. Accordingly, the angle difference (beta-alpha) is about 25 degrees.

If the lengths of the center parts 7a and 9a are too short, it is difficult to adjust the circumferential rigidity of the blocks 8 and 10. Therefore, each length must be at least 10%, especially at least 20%, preferably more than 30%, of the overall length of the lateral groove when measured along the center line GL of the groove.

Apart from this example, the center part 7a, 9a which incline at the above-mentioned specific inclination angle may have a maximum length of 100% of the overall length of the lateral groove 7, 9. In other words, the entire length of the lateral groove 7, 9 may be inclined at the specific inclination angle.

As to the remaining part of the lateral groove (7, 9) other than the center part (7a, 9a), on each side of the center part (7a, 9a) in this example, there is provided a side part (7b, 9b) inclined at an angle different from that of the center part (7a, 9a).

Accordingly, the crown lateral groove 7 is composed of the center part 7a substantially parallel to the tire axial direction, and the side parts 7b. The side parts 7b are preferably inclined at angles in the range of 10 to 45 degrees, more preferably 10 to 35 degrees towards the same direction with respect to the tire axial direction. In this example, further, the side part 7b is made up of two segments inclined at different angles within the range of 10 to 45 degrees. The groove width of the lateral groove 7 is varied in each of the side parts 7b such that the groove width gradually increases towards the groove end.

On the other hand, the shoulder lateral groove 9 is composed of the center part 9a and the side parts 9b. The center part 9a is preferably inclined at an angle of 10 to 45 degrees with respect to the tire axial direction. The side parts 9b are inclined with respect to the center part 9a, and as a result, the side parts 9b become substantially parallel to the tire axial direction. The groove width of the lateral groove 9 is varied in each of the side parts 9b such that the groove width gradually increases towards the groove end.

Therefore, the crown and shoulder blocks 8 and 10 in this example have V-shaped edges abutting the circumferential grooves 5 and 6, and zigzag edges abutting the lateral grooves 7 and 9. As the amplitudes of the zigzag of the lateral grooves 7 and 9 are relatively small when compared with those of the circumferential grooves 5 and 6, the crown block 8 has a generally hexagonal shape, and the shoulder block 10 has a generally pentagonal shape.

Further, to meet the above-mentioned condition (2), the crown lateral grooves 7 are each provided with a tie-bar 12, and the shoulder lateral grooves 9 are each provided with a tie-bar 13. The tie-bar 12, 13 is disposed within the lateral groove 7, 9, and rises radially outwardly from the groove bottom to connect the opposite groove walls with each other. The tie-bar is positioned in the middle of the groove length. As the tie-bar extends continuously from one of the opposite groove walls to the other, the groove depth in this part is decreased, and the decreased groove depth is substantially constant along the length of the tie-bar. The ends of the tie-bars 12 and 13 are positioned at axial distances D1, D2 and D3 from the axially adjacent circumferential grooves 5 and 6.

In this example, between the tie-bars' ends and circumferential grooves, there are provided sloping parts 12a, 12b and 13a as indicated in FIG. 7 by shading with a light gray. Each of the sloping parts 12a, 12b and 13a extends from the tie-bar 12, 13 to the circumferential groove 5, 6, while gradually decreasing the rising height as shown in FIG. 6.

Thus, the above-mentioned axial distance (D1, D2, D3) corresponds to the axial length of the sloping part (12a, 12b, 13a).

To accord with the condition (2), the distances D1, D2 and D3 have the following relationship:

D1<D2<D3.

D1 is the axial distance from the axially inner end of the tie-bar 12 to the circumferential groove 5 which distance corresponds to the axial length of the sloping part 12a.

D2 is the axial distance from the axially outer end of the tie-bar 12 to the circumferential groove 6 which distance corresponds to the axial length of the sloping part 12b.

D3 is the axial distance from the axially inner end of the tie-bar 13 to the circumferential groove 6 which distance corresponds to the axial length of the sloping part 13a.

The shoulder lateral grooves 9 are also provided with similar sloping parts 13b each extending from the axially outer end of the tie-bar 13 to the axially outer end of the shoulder lateral groove.

The sloping parts 12a, 12b and 13a are preferable in view of drainage (leading water to circumferential grooves), traction or grip (after tread wear reaches to tie-bar), gradual tread pattern change and the like. Thus, the provision of the sloping parts 12a, 12b and 13a and also 13b is not limited to this example. Such sloping parts can be preferably employed in various tread patterns including those based on the circumferential groove arrangements shown in FIGS. 1-4.

If the above-mentioned axial distances D (D1, D2 . . . ) are too small, it becomes difficult to control or adjust the block rigidity, therefore it is difficult to optimize the rigidity distribution. If too large, on the other hand, as the tie-bar becomes short, it is difficult to increase the block rigidity, thus again it becomes difficult to optimize the rigidity distribution.

Therefore, the distances D is at least 5 mm, preferably at least 7 mm, but at most 30 mm, preferably at most 20 mm.

The differences between the axial distances D, namely, (D1 and D2), (D2 and D3), (D3 and D4) . . . , are preferably at least 2 mm, more preferably at least 4 mm, but at most 10 mm.

The axial distances D or the axial lengths of the sloping parts are smaller than the axial length of the tie-bar.

In order to refer to the rising heights h1 and h2 of the tie-bars 12 and 13, the depths of the lateral grooves 7 and 9 should be defined here.

In this example, as the lateral grooves 7 and 9 are each provided with the tie-bar accompanied by the sloping part(s), the almost entire length of the groove bottom is more or less risen. Therefore, the original groove depth is somewhat unclear. But, basically, the depths of the crown and shoulder lateral grooves 7 and 9 are substantially same as the depths of the circumferential grooves 5 and 6 to which the lateral grooves 7 and 9 are connected. In consideration of such potential ambiguity, the rising heights h1 and h2 are defined based on the groove depth GD of the deepest circumferential groove (5, 6).

If the rising height is too small, it is difficult to increase the circumferential rigidity of the blocks because it is difficult for the circumferentially adjacent blocks to support each other through the tie-bars. If however, the height is too large, the drainage performance is deteriorated.

Therefore, the heights h1 and h2 are at least 20%, preferably more than 25%, but at most 85%, preferably less than 80%, of the depth GD of the deepest circumferential groove (5, 6).

As explained, the heights h1 and h2 are radial heights from a groove-bottom line ZL drawn in parallel with the tread surface, passing through the bottom of the deepest circumferential groove (5, 6) as shown in FIG. 6.

Usually, the heights h1 and h2 of the tie-bars 12 and 13 are the substantially same values. In this example, however, as shown in FIG. 6, two different heights h1 and h2 are used in order to change the tread pattern with progress in the tread wear.

More specially, the height h2 of the tie-bars 13 within all the shoulder lateral grooves 9 are increased more than the height h1, whereby the initial block pattern turns to a block-and-rib pattern from the middle stage of the tread wear life and then it further turns to a rib pattern which is maintained until the end of the tread wear life.

The above-mentioned sloping parts 12a, 12b 13a and 13b can prevent a sudden drastic change in the tread pattern. Further, the sloping parts can form notches extending from the circumferential groove into the resultant rib, and the performance of the tire as a summer tire, e.g. wet grip, drainage and the like can be improved.

In order to prevent stone entrapment in the circumferential grooves 5 and 6, each circumferential groove 5, 6 is provided with platforms 11, namely, small independent protrusions disposed in the groove bottom at intervals along the length of the groove. The platforms 11 each have a height of about 1/3 to 1/6 times the groove depth, and a width of about one third of the groove width measured at the top of the platform 11.

Also, in view of self cleaning by releasing and expelling the mud or other objects while rotating, it is preferable that the circumferential grooves have, as shown in FIG. 6, such a shape that the distance (width) between the opposite groove walls gradually increases from the groove bottom to the groove top at which the groove width GW is defined. For the same reason, such cross sectional shape is also preferable for the lateral grooves 7 and 9. Therefore, as shown in FIGS. 8a, 8b, 8c, 9a, 9b and 9c, the lateral grooves 7 and 9 are each provided with a radially outwardly widening cross sectional shape along the substantially entire length of the groove.

Further, in this example, the crown blocks 8 are each provided with a narrow and shallow zigzag groove 15 having a width of about 1.5 to 3.5 mm, and a depth of about 2.0 to 4.0 mm.

Comparison Tests

Heavy duty radial tires of size 11R22.5 (rim size: 22.5× 8.25) for trucks and buses were manufactured and tested for the uneven wear resistance and traction performance. All the test tires had the same tread pattern and same structure shown in FIGS. 5 and 6 except for the tie-bars. The specifications thereof are shown in Table 1.

Uneven Wear Resistance Test:

The test tire mounted on a wheel rim and inflated to 800 kPa was attached to a truck, and run for 50,000 km (expressway about 80%, highway about 20%). The amount of wear was measured at the heel and toe edges of the crown blocks and shoulder blocks located at circumferentially different six positions around the tire, and the average value thereof was obtained as the amount of uneven wear of the tire. The reciprocal numbers of the obtained average values are indicated in Table 1 by using an index based on Ref. 1 being 100, wherein the larger the index number, the better the uneven wear resistance.

Wet Traction Test:

on a wet asphalt road covered with 10 mm depth water, the truck was started at full acceleration, and the time required for running a predetermined distance of 20 meters was measured. The reciprocal numbers of the measured times are indicated in Table 1 by using an index based on Ref. 1 being 100, wherein the larger the value, the better the traction.

TABLE 1

| Tire | Ref. 1 | Ref. 2 | Ref. 3 | Ex. 1 | Ex. 2 | Ex. 3 | Ex. 4 | Ex. 5 |
| --- | --- | --- | --- | --- | --- | --- | --- | --- |
| Tread width (mm) | 220 | 220 | 220 | 220 | 220 | 220 | 220 | 220 |
| Circumferential grooves 5 & 6 | | | | | | | | |
| Width GW (mm) | 12 | 12 | 12 | 12 | 12 | 12 | 12 | 12 |
| Depth GD (mm) | 18 | 18 | 18 | 18 | 18 | 18 | 18 | 18 |
| Shoulder lateral grooves 9 | | | | | | | | |
| Axial lengths (mm) | 45 | 45 | 45 | 45 | 45 | 45 | 45 | 45 |
| Width at center (mm) | 9.5 | 9.5 | 9.5 | 9.5 | 9.5 | 9.5 | 9.5 | 9.5 |
| Inclination angle (beta) (deg.) | 15 | 15 | 15 | 15 | 25 | 35 | 15 | 15 |
| Tie-bars 13 | | | | | | | | |
| Height h2 (mm) | 12 | 12 | 12 | 12 | 12 | 12 | 12 | 12 |
| Crown lateral grooves 7 | | | | | | | | |
| Axial lengths (mm) | 45 | 45 | 45 | 45 | 45 | 45 | 45 | 45 |
| Width at center (mm) | 9.5 | 9.5 | 9.5 | 9.5 | 9.5 | 9.5 | 9.5 | 9.5 |
| Inclination angle (alpha) (deg.) | 15 | 15 | 0 | 0 | 0 | 0 | 0 | 0 |
| Tie-bars 12 | | | | | | | | |
| Height h1 (mm) | 9 | 9 | 9 | 9 | 9 | 9 | 9 | 9 |
| D1 (mm) | 10 | 5 | 10 | 5 | 5 | 5 | 5 | 5 |
| D2 (mm) | 10 | 10 | 10 | 10 | 10 | 10 | 8 | 13 |
| D3 (mm) | 10 | 15 | 10 | 15 | 15 | 15 | 11 | 21 |

TABLE 1-continued

| Tire | Ref. 1 | Ref. 2 | Ref. 3 | Ex. 1 | Ex. 2 | Ex. 3 | Ex. 4 | Ex. 5 |
|---|---|---|---|---|---|---|---|---|
| Test Results | | | | | | | | |
| Uneven wear resistance | 100 | 108 | 110 | 122 | 124 | 125 | 123 | 120 |
| Wet traction | 100 | 104 | 106 | 113 | 109 | 108 | 116 | 112 |

From the test results shown in Table 1, it is confirmed that the resistance to uneven wear can be remarkably improved while the traction is also remarkably improved.

The present invention is suitably applied to heavy duty radial tires, but it can be also applied to various tire as far as the tread portion is provided with a block-based pattern and has a relatively round profile such that the ground pressure is increased in the tread crown portion, for instance, light truck tires, SUV tires and the like.

The invention claimed is:

1. A pneumatic tire comprising a tread portion provided with at least two circumferential grooves and lateral grooves extending from the circumferential grooves so as to form blocks which are circumferentially divided by the lateral grooves and arranged in at least three circumferential rows axially divided by said at least two circumferential grooves, each said lateral groove provided with a tie-bar rising from the groove bottom to a certain height within the depth of the lateral groove so as to connect the opposite groove walls with each other, wherein said tie-bar extends along the lateral groove towards the adjacent circumferential grooves or groove but terminates before said circumferential grooves or groove so as to provide certain distances (D1, D2, D3, D4, D5) therebetween, and an axial central part of the lateral groove has an inclination angle ($\alpha$, $\alpha$1, $\alpha$2, $\beta$) with respect to the tire axial direction, wherein the distances (D1, D2, D3, D4, D5) are gradually decreased from the axially outside to the axially inside of the tread portion, and the inclination angles ($\alpha$, $\alpha$1, $\alpha$2, $\beta$) are gradually decreased from the axially outside to the axially inside of the tread portion, wherein said at least three circumferential rows are four or five or six circumferential rows, and in the case of the four circumferential rows, said certain distances are three different distances D1, D2, and D3 in the order from the axially inside to the outside of the tire, and D1<D2<D3, and the inclination angles are two different angles $\alpha$ and $\beta$ in the order from the axially inside to the outside of the tire, and 0 degrees$\leq\alpha<\beta<$45 degrees, in the case of the five circumferential rows, said certain distances are four different distances D1, D2, D3 and D4 in the order from the axially inside to the outside of the tire, and D1<D2<D3<D4, and the inclination angles are three different angles $\alpha$1, $\alpha$2 and $\beta$ in the order from the axially inside to the outside of the tire, and 0 degrees$\leq\alpha$1$\leq\alpha$2$<\beta<$45 degrees, in the case of the six circumferential rows, said certain distances are five different distances D1, D2, D3, D4 and D5 in the order from the axially inside to the outside of the tire, and D1<D2<D3<D4<D5, and the inclination angles are three different angles $\alpha$1, $\alpha$2 and $\beta$ in the order from the axially inside to the outside of the tire, and 0 degrees$\leq\alpha$1$\leq\alpha$2$<\beta<$45 degrees.

2. The pneumatic tire according to claim 1, wherein said at least two circumferential grooves are zigzag grooves.

3. The pneumatic tire according to claim 1, wherein the lateral grooves between the blocks in at least one of the circumferential rows are each provided on each side of the tie-bar with a sloping part having a rising height gradually decreasing from the tie-bar toward the adjacent groove end of the lateral groove.

4. The pneumatic tire according to claim 1, wherein the length of the central part having said inclination angle ($\alpha$, $\alpha$1, $\alpha$2, $\beta$) is at least 10% of the overall length of the lateral groove.

5. The pneumatic tire according to claim 1, wherein said at least three circumferential rows include a first row in which the tie-bars have first heights, and a second row in which the tie-bars have second heights, and the first heights are higher than the second heights, whereby as the tread wear progresses, the blocks in the first row turn to a rib earlier than the blocks in the second row.

6. The pneumatic tire according to claim 5, wherein said first row is located axially outside the second row.

7. The pneumatic tire according to claim 1, wherein each said lateral groove provided with the tie-bar is provided on each side of the tie-bar with a sloping part having a rising height gradually decreasing from the tie-bar toward the adjacent groove end of the lateral groove.

8. The pneumatic tire according to claim 7, wherein said at least three circumferential rows include an axially outer first row in which the tie-bars have first heights, and an axially inner second row in which the tie-bars have second heights, and the first heights are higher than the second heights.

* * * * *